United States Patent [19]

Mikata

[11] Patent Number: 4,825,896
[45] Date of Patent: May 2, 1989

[54] COMBINATION WEIGHER

[75] Inventor: Yoshitaka Mikata, Himeji, Japan

[73] Assignee: Yamato Scale Company, Limited, Japan

[21] Appl. No.: 137,256

[22] Filed: Dec. 23, 1987

[30] Foreign Application Priority Data

Dec. 26, 1986 [JP] Japan .......................... 61-203066[U]

[51] Int. Cl.$^4$ ............................................. G01G 13/00
[52] U.S. Cl. ................................................. 177/25.18
[58] Field of Search ...................................... 177/25.18

[56] References Cited

U.S. PATENT DOCUMENTS 4,454,924  6/1984  Minamida .......................... 177/25.18
4,618,012  10/1986  Yamano et al. .................. 177/25.18

*Primary Examiner*—George H. Miller, Jr.
*Attorney, Agent, or Firm*—Senniger, Powers, Leavitt and Roedel

[57] ABSTRACT

A combination weigher of the type having a plurality of weigh hoppers arranged in a circle. Each weigh hopper has inner and outer discharge gates, the inner gate being adapted to discharge product inside of the circle and the outer gate being adapted to discharge the the product outside of the circle. A plurality of auxiliary hopper structures underly respective weigh hoppers, and a common collection chute underlies the auxiliary hopper structures. In order to reduce the diameter of the collection chute and the overall outer diameter of the weigher, each auxiliary hopper structure comprises an auxiliary hopper disposed under the outer discharge gate of a respective weigh hopper for receiving product discharged therefrom through the outer discharge gate, and a chute mechanism for directing product discharged through the inner gate of a respective weigh hopper to the collection chute and for direction product discharged from the auxiliary hopper to the collection chute.

5 Claims, 4 Drawing Sheets

COMBINATION WEIGHER

BACKGROUND OF INVENTION

This invention relates to a combination weigher and, especially, to a combination weigher having auxiliary hoppers.

FIGS. 1(a) and 1(b) show a specific arrangement of mechanical components of a prior art combination weigher, which is suggested, for example, in the Japanese patent opening gazette No. 58-41326. In the drawings, a plurality of electromagnetic feeders 4 are radially arranged around a dispersion feeder 2 and a feed hopper 6 is disposed under the distal end of each electromagnetic feeder 4. A weigh hopper 8 is disposed under each feed hopper 6 and an auxiliary hopper 10 is disposed under each weigh hopper 8. The feed, weigh and auxiliary hoppers 6, 8 and 10 are respectively arranged annularly in concentric fashion. Each weigh hopper 8 has an outer gate 12a for discharging product directly downward and an inner gate 12b for feeding product into the underlying auxiliary hopper 10. Accordingly, the auxiliary hoppers 10 are arranged annularly under the inner gates 12b. A collection chute 14 is disposed under the auxiliary hoppers 10 for collecting product discharged from weigh hoppers 8 and/or auxiliary hoppers 10. Each auxiliary hopper 10 has a discharge gate 16 adapted to open inwardly as shown in phantom 16' and each feed hopper 6 also has a similar discharge gate 18.

However, a combination weigher with the aforementioned arrangement of weigh hoppers 8 and auxiliary hoppers 10 requires a collection chute of relatively large diameter at its upper end. On the one hand, assuming the gate 16' of each auxiliary hopper 10 has a width b1 as shown in FIG. 1b, the auxiliary hoppers must be positioned so that the lower edges of the opened gates 16' never project inwardly beyond a corresponding regular polygon having a side length b1, in order to ensure that the gate 16' of each hopper may open without any interference from the other gates 16. On the other hand, since each auxiliary hopper 10 is disposed directly under the inner gate 12b of a corresponding weigh hopper 8, the collection chute 14 must have a diameter sufficiently large to completely collect the product discharged from the outer gates 12a of weigh hoppers 8. In the prior art combination weigher, such a bulky collection chute has resulted not only in an increased overall machine size and a corresponding increase in the area occupied by the machine, but also in substantial difficulty in maintenance service. While the gate width b1 may be reduced to remove the above-mentioned problem, this will result in reduction of the flow rate of product which causes undesirable reduction in machine efficiency. Although the flow rate can be maintained by increasing the height of gate 16, this will result in undesirable increase in the machine height.

SUMMARY OF INVENTION

Accordingly, an object of this invention is to provide an improved structure of combination weigher which enables the collection chute diameter to be reduced for reducing the area occupied by the machine and facilitating maintenance service, without increasing in the machine height and reducing machine efficiency.

This object can be attained in accordance with this invention by providing a combination weigher having a plurality of weigh hoppers arranged on a circle and a plurality of auxiliary hopper structures disposed under respective weigh hoppers. Each weigh hopper has an inner gate adapted to discharge the contents of the weigh hopper inside of said circle and an outer gate adapted to discharge the contents of the weigh hopper outside of said circle. A funnel-like common collection chute disposed under the auxiliary hopper structures.

As a feature of this invention, each auxiliary hopper structure comprises an auxiliary hopper located directly under the outer gate of the corresponding weigh hopper and, as another feature of this invention, each auxiliary hopper structure is provided with chute means for directing the discharged product to the center of the collection chute.

These and other objects and features of this invention will be best understood from the following description with reference to the accompanying drawings.

BRIEF DESCRIPTION OF DRAWINGS

In the drawings.

Throughout the drawings, the same reference numerals are given to corresponding structural components.

DESCRIPTION OF PREFERRED EMBODIMENTS

Figure 2A:
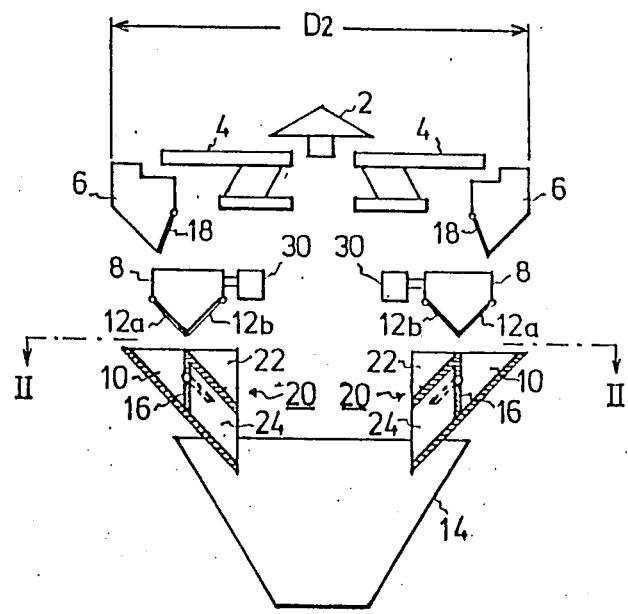
FIG. 2(a) is a schematic side view, partly in section, representing a mechanical configuration of an embodiment of a combination weigher according to this invention.

Referring to FIGS. 2(a) and (b) showing a first embodiment, a plurality of electromagnetic feeders 4 are arranged radially around a dispersion feeder 2 and a feed hopper 6 is disposed under the distal end of each electromagnetic feeder 4. Thus, the feed hoppers 6 are arranged annularly. Each feed hopper 6 has a discharge gate 18 for closing its bottom outlet. A weigh hopper 8 is disposed under each feed hopper 6 for receiving product therefrom when the gate 18 is opened. Thus, the weigh hoppers 8 are also arranged annularly on a circle C. Each weigh hopper 8 is coupled to a load cell 30 for sensing the weight of product fed into the hopper 8. As in the aforementioned prior art device, each weigh hopper 8 has two bottom outlets respectively directed to the outside and inside of the circle C formed by the weigh hoppers 8 and these outlets are respectively closed by outer and inner discharge gates 12a and 12b. Disposed under each weigh hopper 8 is an auxiliary hopper structure 20 according to this invention.

Each auxiliary hopper structure 20 is formed as a discrete compact unit comprising a pair of triangular side plates and two slanting slide plates which form chute means comprising upper and lower chutes 22 and 24. The lower chute 24 is partitioned by a vertical gate or door 16 pivoted on the underside of the upper chute 22 to form an auxiliary hopper 10 in the upper portion of the lower chute 24. A funnel-like collection chute 14 which may be much smaller than that of the prior art is disposed under the auxiliary hopper structures 20. Each auxiliary hopper structure is designed and positioned so that the contents of the overhead weigh hopper 8 are fed to the auxiliary hopper 10 when the outer gate 12a opens, while the contents of the weigh hopper 8 are discharged through the upper chute 22 into the collection chute 14 when the inner gate 12b opens. The contents of the auxiliary hopper 10 are discharged through the lower chute 24 into the collection chute 14 when the gate 16 swings open.

In operation, product to be weighed is fed by the feed hoppers 6 to the underlying weigh hoppers 8 and weighed by the associated load cells 30. The emptied feed hoppers 6 are reloaded by the electromagnetic feeders 4. The resultant weight indicative signals from the load cells 30 are digitized by A/D convertors (not shown) and supplied to a control unit (not shown) composed of a microcomputer or the like. Then, the control unit acts to open the outer gates 12a of the corresponding weigh hoppers 8 to transfer the contents thereof to the corresponding auxiliary hoppers 10. Upon completion of this transference, the control unit acts to open the discharge gates 18 of the corresponding feed hoppers 6 to reload the emptied weigh hoppers 8 and the sensors 30 provide the weight information of the new product to the control unit. Thus, the control unit is now keeping the weights of product contained in all weigh and auxiliary hoppers 8 and 10. Then, the control unit produces various combinations of these weights and selects therefrom a combination having a total weight equal or close to a predetermined target weight. At the same time, the control unit drives the electromagnetic feeders 4 to reload the emptied feed hoppers 6 and then drives the dispersion feeder 2 to feed new product to the electromagnetic feeders 4. Upon completion of the combination selecting operation, the control unit acts to open the gates 12b and/or 16 of those weigh and/or auxiliary hoppers 8 and/or 10 which contain product batches whose weights form the selected combination. The contents of these hoppers are discharged through respective upper and/or lower chutes 22 and 24 into the collection chute 14 for delivery. Upon completion of this discharge, the control unit acts to open the outer gate 12a of weigh hopper 8 corresponding to each emptied auxiliary hopper 10 and, also, to open the discharge gate 18 of the feed hopper 6 corresponding to each emptied weigh hopper 8, to reload these emptied hoppers. If the corresponding weigh and auxiliary hoppers 8 and 10 have been emptied at the same time, the control unit acts to reload the weigh hopper only. The above-mentioned operation is repeated in succession.

Figure 1A:
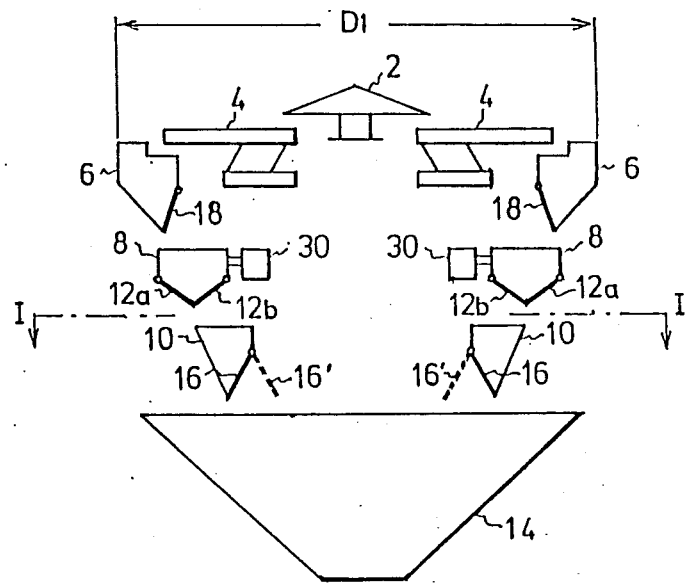
FIG. 1(a) is a schematic side view representing a mechanical configuration of a prior art combination weigher pertinent to this invention.
Figure 1B:
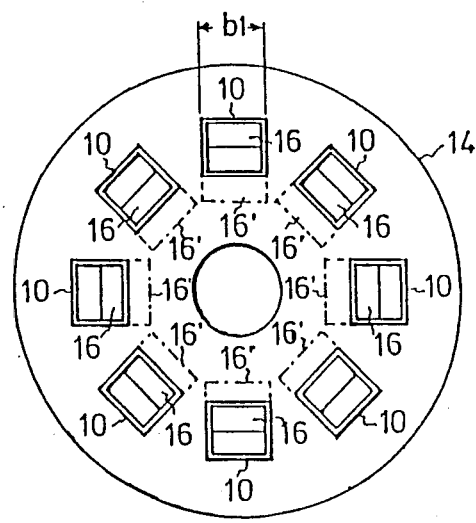
FIG. 1(b) is a sectional plan view along a line I—I of FIG. 1(a)
Figure 2B:
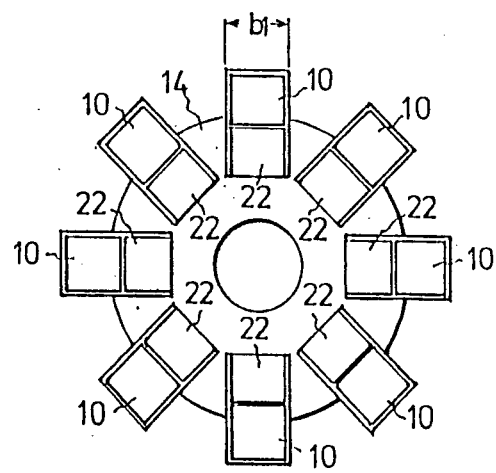
FIG. 2(b) is a sectional plan view along a line II—II of FIG. 2(a)

It will be understood from a comparison of FIGS. 1 and 2 that the outer diameter D2 of this embodiment is less than that of the prior art device D1 even though the auxiliary hopper gates of both have the same width b1 (see FIG. 2b). This is because the weigh hoppers 8 of FIG. 2 are moved inward with respect to the the auxiliary hoppers 10 even though the size of the polygon formed by the inner edges of the chutes 24 remains unchanged. Moreover, the collection chute 14 in this embodiment has been substantially reduced in size.

Figure 3A:
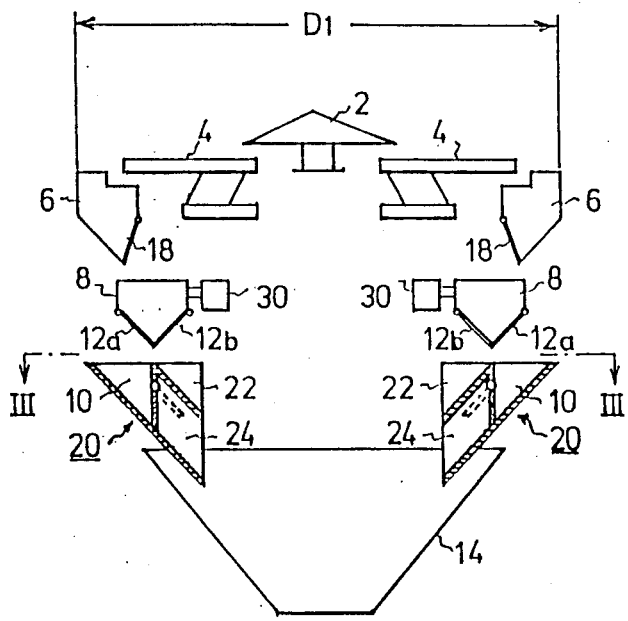
FIG. 3(a) is a schematic side view, partly in section, representing a mechanical configuration of another embodiment of a combination weigher according to this invention.

FIGS. 3(a) and (b) show a second embodiment of this invention. In this embodiment, the structure of the first embodiment is expanded horizontally to maintain the outer diameter D1 of the prior art device. With this expansion, it becomes possible to increase the gate width from b1 to b2 thereby increasing the flow rate to improve the machine efficiency. This embodiment will not be described further since it is similar in both structure and operation to the above-described first embodiment.

Figure 3B:
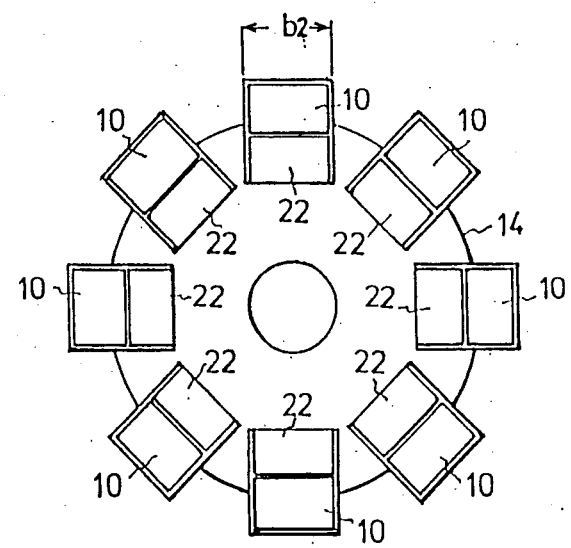
FIG. 3(b) is a sectional plan view along a line III—III of FIG. 3(a)
Figure 4A:
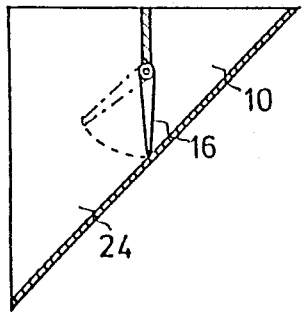
FIGS. 4(a), (b) and (c) are sectional side views representing three variations of an auxiliary hopper construction according to this invention.
Figure 4B:
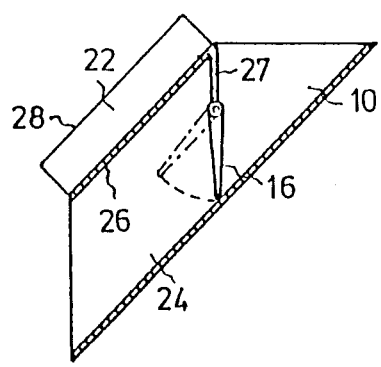
Figure 4C:
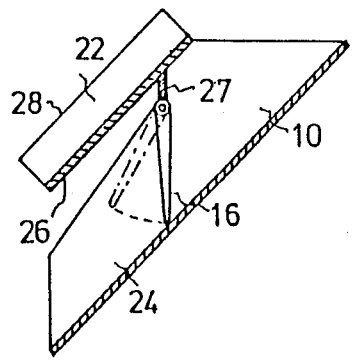

FIG. 4(a) shows a variation in the construction of the auxiliary hopper 20, in which the upper chute 22 of FIGS. 2 and 3 is removed and the lower chute 24 is used for product discharged from both the weigh and auxiliary hoppers 8 and 10. FIG. 4(b) shows another variation in the construction of the auxiliary hopper 20 wherein the slide plate 26 of the upper chute 22 is formed integral with the partition plate 27 of the auxiliary hopper 10, and wherein a pair of guide walls 28 are attached thereto to form the upper chute 22. FIG. 4(c) shows a further variation in which the slide plate 26 of the upper chute 22 covers a part of the auxiliary hopper 10 and also has a pair of guide walls 28.

The above description has been made only for the purpose of illustration but not for limitation. Various modifications and variations can be made within the scope of this invention. For example, the inner and outer gates may be attached to a single bottom outlet of each weigh hopper, instead of two separate outlets.

As described above, with the structure according to this invention, it becomes possible to reduce the overall diameter of the machine, thereby reducing the area it occupies. Moreover, the improved auxiliary hopper structure contributes to substantial reduction in the size of the collection chute. This reduced collection chute size and compact arrangement of the auxiliary hoppers also contribute to easy detachment and handling thereof by a sole operator, thereby facilitating his cleaning and like operations for maintenance service.

I claim:

1. A combination weigher comprising a plurality of weigh hoppers generally arranged in a circle, each weigh hopper having an inner discharge gate adapted to discharge product inside of said circle and an outer discharge gate adapted to discharge product outside of said circle, a plurality of auxiliary hopper structures disposed under respective weigh hoppers, and a collection chute disposed under the auxiliary hopper structures, wherein each auxiliary hopper structure comprises an auxiliary hopper disposed under the outer discharge gate of a respective weigh hopper for receiving product discharged from the weigh hopper through the outer discharge gate, and chute means for directing product discharged through the inner discharge gate of the corresponding weigh hopper to the collection chute and for directing product discharged from said auxiliary hopper to the collection chute.

2. A combination weigher as set forth in claim 1 wherein said chute means comprises a first chute for directing product discharged through the inner discharge gate of a respective weigh hopper to the collection chute and a second chute separate from the first chute for directing product discharged from a respective auxiliary hopper to the collection chute.

3. A combination weigher as set forth in claim 2 wherein said first chute is disposed above said second chute.

4. A combination weigher as set forth in claim 3 wherein each auxiliary hopper comprises a gate pivoted on the underside of said first chute for swinging from a closed position to an open position for discharge of product from the auxiliary hopper.

5. A combination weigher as set forth in claim 1 wherein said chute means comprises a single chute for directing product discharged from both a respective weigher and/or a respective auxiliary hopper to said collection chute.

* * * * *